(12) United States Patent
Sorensen

(10) Patent No.: US 7,343,685 B1
(45) Date of Patent: Mar. 18, 2008

(54) THREAD VERIFICATION AND CHASING APPARATUS AND METHOD

(76) Inventor: Fred Sorensen, 2525 Aero Park Dr., Traverse City, MI (US) 49686

( * ) Notice: Subject to any disclaimer, the term of this patent is extended or adjusted under 35 U.S.C. 154(b) by 133 days.

(21) Appl. No.: 11/426,813

(22) Filed: Jun. 27, 2006

(51) Int. Cl.
*G01B 5/00* (2006.01)

(52) U.S. Cl. .......................... 33/199 B; 408/7; 408/69

(58) Field of Classification Search ............. 33/199 B, 33/199 R, 501.11, 501.12, 501.19; 408/7, 408/69
See application file for complete search history.

(56) References Cited

U.S. PATENT DOCUMENTS

| | | | | |
|---|---|---|---|---|
| 1,130,866 A | * | 3/1915 | Wells et al. ............... | 33/199 R |
| 1,588,362 A | * | 6/1926 | Hanson et al. ............ | 33/199 R |
| 2,909,081 A | * | 10/1959 | Kuts ........................... | 408/7 |
| 3,218,724 A | * | 11/1965 | Schaumberger ........... | 33/199 R |
| 3,582,225 A | * | 6/1971 | Hanzel ....................... | 408/6 |
| 3,859,730 A | * | 1/1975 | Johnson ..................... | 33/199 R |
| 4,740,120 A | * | 4/1988 | Wickham et al. .......... | 408/130 |
| 5,020,230 A | * | 6/1991 | Greenslade ................ | 33/199 R |
| 5,069,051 A | * | 12/1991 | Olah ............................. | 72/68 |
| 5,538,369 A | * | 7/1996 | Okuda ........................... | 408/3 |
| 5,733,199 A | * | 3/1998 | Capri .......................... | 470/98 |
| 6,599,115 B2 | * | 7/2003 | Chalcraft et al. ........... | 425/556 |

* cited by examiner

*Primary Examiner*—Christopher W Fulton
(74) *Attorney, Agent, or Firm*—Northern Michigan Patent Law, PLC

(57) ABSTRACT

A thread checking apparatus and method for threaded bores in small plastic parts, in which a threaded tap is mounted to rotate on a fixed axis at a workstation, the workstation having guide structure associated with the rotating tap to slidingly engage and guide a part with a threaded bore onto a free outer end of the rotating tap. The rotating tap draws the part down the length of the tap in sliding, rotation-preventing engagement with the guide structure, until the part's threaded bore is fully verified and chased, at which point the part engages a reversing limit switch to automatically reverse the rotation of the tap and drive the chased and verified part back off the tap.

10 Claims, 5 Drawing Sheets

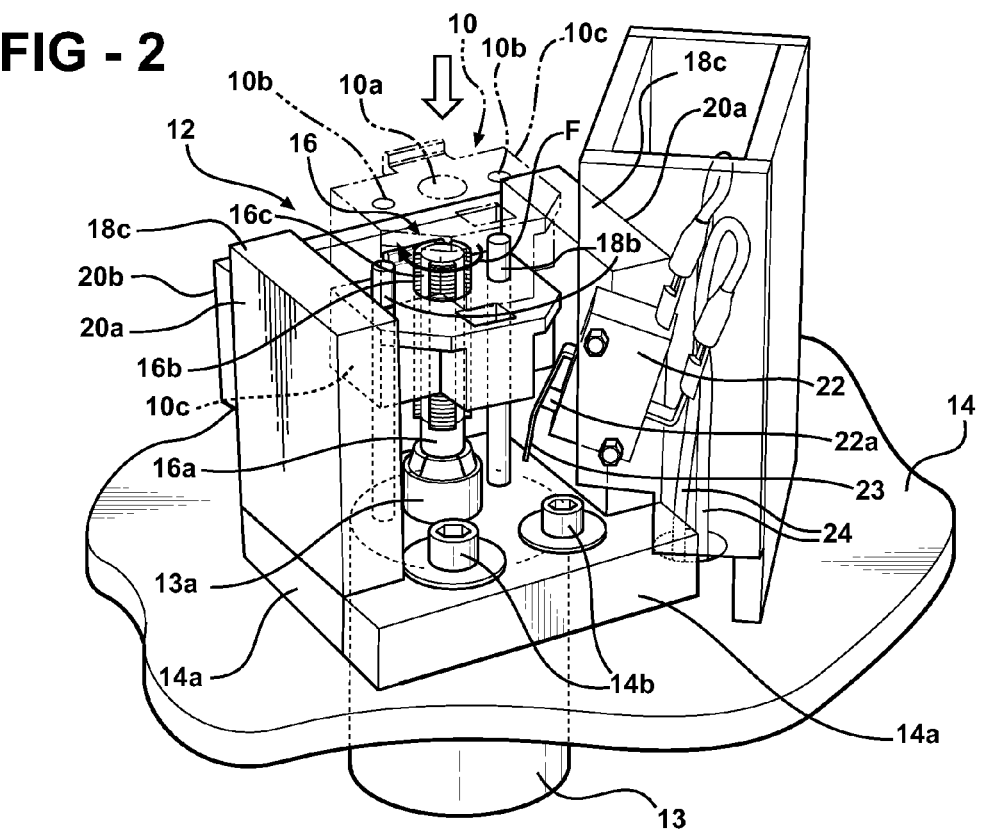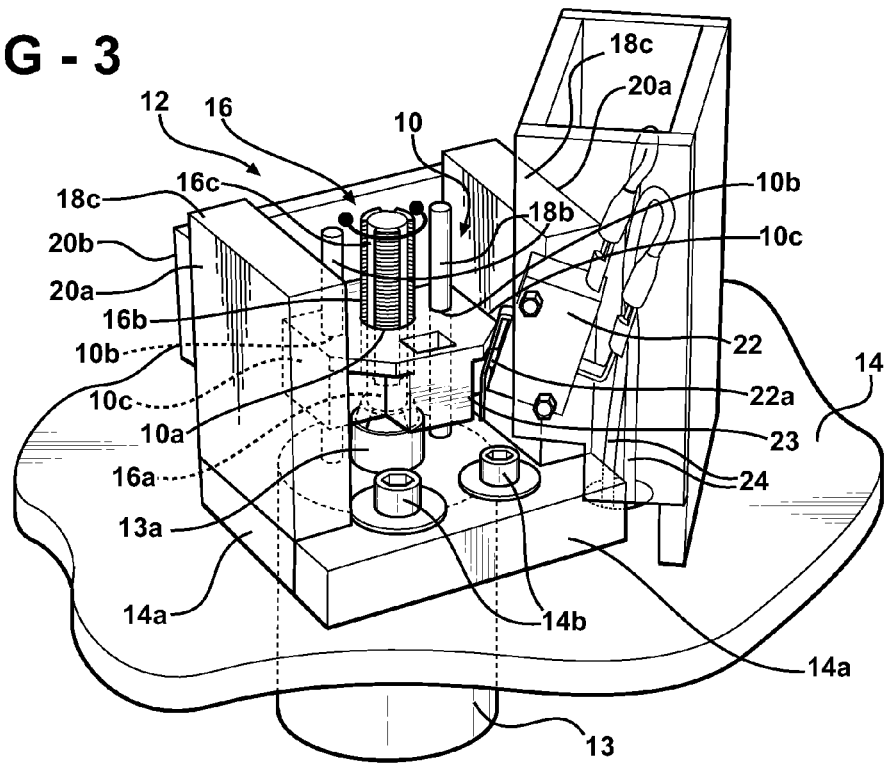

US 7,343,685 B1

THREAD VERIFICATION AND CHASING APPARATUS AND METHOD

FIELD OF THE INVENTION

The invention is in the field of apparatus and methods for verifying and chasing threaded bores in small parts.

BACKGROUND OF THE INVENTION AND DESCRIPTION OF RELATED ART

Molded plastic parts with molded-in threaded bores often require the thread/bore diameter to be verified for consistency before the molded parts are shipped for assembly with mating threaded parts. Bore and thread gauges are known, but while useful for gauging the open ends of the bore, are generally not practical for measuring inconsistencies along the full length of relatively small diameter bores in large numbers of parts. Molded bores in both thermoplastic and thermosetting plastic materials often tend to "hourglass" or constrict adjacent thicker areas of the part that create heat sinks affecting the cooling rate along the bore. If tolerances are strict, the need for full-length bore verification in parts prone to this problem becomes important. Moreover, bore gauges only diagnose the problem.

It has been known to use a specially machined threaded tap (or one of the mating parts, modified to cut) to verify and "chase" or remove extra material from the bore by attaching the tap to a hand drill and running it manually through the bore.

BRIEF SUMMARY OF THE INVENTION

The present invention is an automated thread-verification and thread-chasing apparatus in which a tap rotates about a fixed axis on a base such as a worktable, driven for example by an electric motor. A fixed, stable, passive guide structure associated with the rotating tap receives the part in sliding fashion to guide the part's threaded bore onto the free outer end of the rotating tap. The parallel guide structure maintains the part's bore in alignment with the tap's axis, prevents the part from rotating, and allows the part to be drawn smoothly and evenly down over the length of the rotating tap. Bores with reparable hour-glassing are automatically chased; parts with irreparably hour-glassed bores and parts with oversized bores will not be drawn fully or smoothly over the rotating tap, and can be discarded.

In a further form of the invention, the tap rotates by default in a reverse mode that drives the part off the end of the tap. The apparatus is provided with a motor-reversing switch operated when the part is loaded into the apparatus to reverse the tap and draw the part down over the tap. A reversing limit switch is operated automatically via a cam associated with the guide structure when the part bottoms out on the tap, switching the tap rotation back into default mode and automatically driving the part back off the free end of the tap. The person checking the bores simply places the part on the guide structure, presses the motor-reversing switch (if operated manually), watches while the part is verified, chased, and driven back off the tap, and then removes the part from the guides. In the preferred form the reversing limit switch is manually accessible to the workstation operator, and is used to initially reverse the motor when the part is first loaded.

In yet a further form of the invention, the rotating tap has an adjustable cutting diameter. The tap is cut or split over a portion of its length into multiple cantilevered sections with spaced cutting flutes separated by relief areas. The cantilevered sections are internally tapped to form an internally threaded center bore capable of accepting a tapered screw. The tapered screw is used to adjust the radial spacing of the cantilevered sections, and when properly adjusted the sections are locked in place, for example with a removable spot weld on the screw.

The invention also includes the method of running a fixed, table-mounted tap in a default reverse (part-ejecting) rotational direction in the confines of a parallel passive guide structure; loading a part onto the guide structure to cause a threaded bore in the part to be guided onto and mated with the end of the tap; operating a motor-reversing switch to change the rotation of the tap to engage and draw the part down over the tap via its engagement with the threaded bore; and, automatically operating a reversing limit switch with the moving part when the part bottoms out on the guide structure, returning the tap to its default, part-ejecting rotational mode and automatically driving the chased/verified part back off the tap where it can be removed from the guide structure.

These and other features and advantages of the invention will become apparent upon further reading in light of the accompanying drawings.

BRIEF DESCRIPTION OF THE DRAWINGS

FIG. 2 is similar to FIG. 1, but the molded part has been placed on the guide and engaged by the rotating tap, and is being drawn down the tap and guide structure.

FIG. 3 is similar to FIG. 1, but shows the molded part hitting a reversing limit switch associated with the guide, momentarily stopping and then reversing to rotate in the opposite direction to drive the part up off the tap and guide structure.

DETAILED DESCRIPTION OF THE INVENTION

Figure 1:
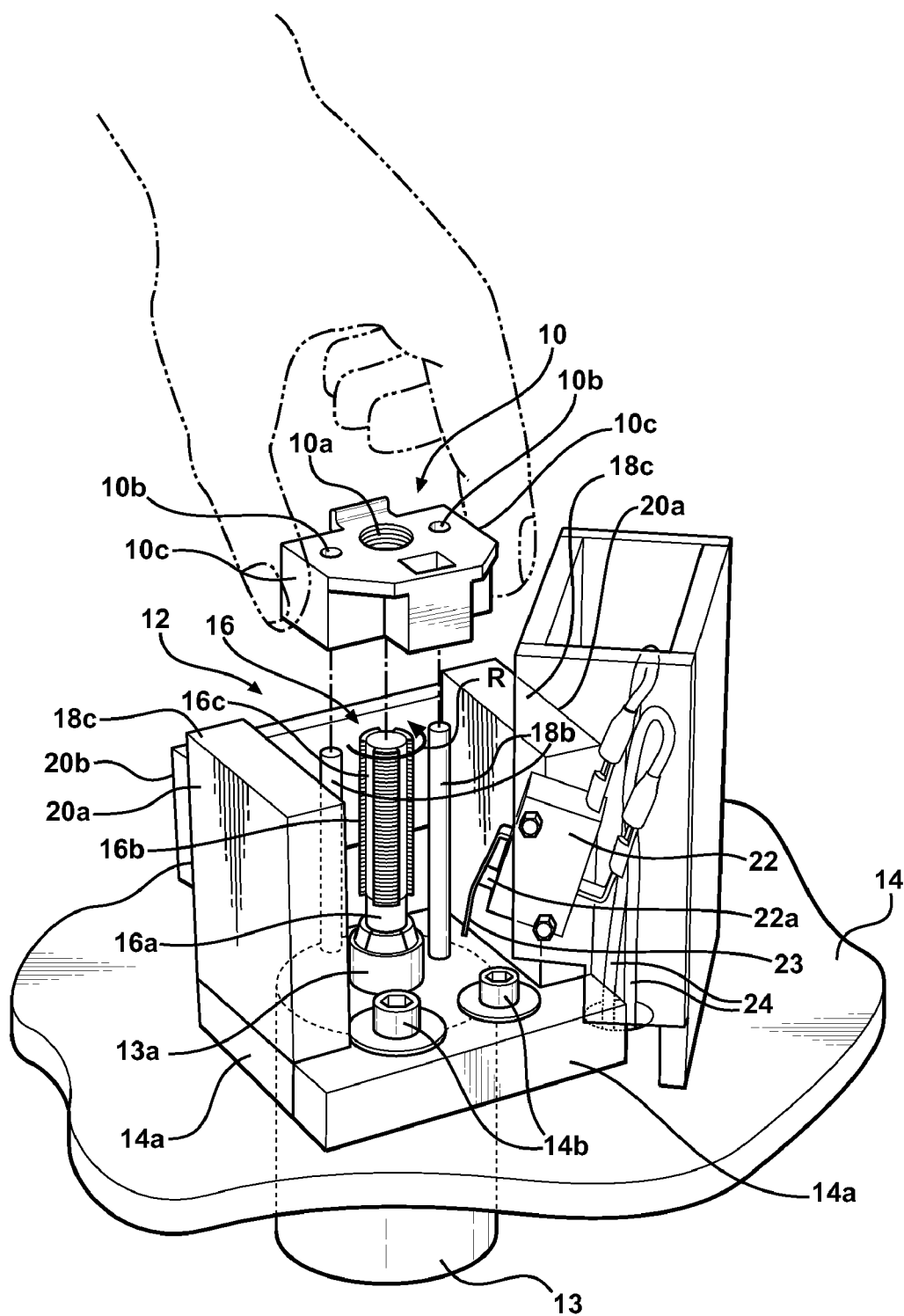
FIG. 1 is a perspective view of an apparatus according to the present invention, in which a molded plastic part with a threaded bore is about to be engaged with a guide portion of the apparatus that guides the part onto a rotating tap.

Referring first to FIG. 1, a molded part 10 made from a thermosetting or thermoplastic polymer material of known type is shown elevated above an automated thread verification and chase apparatus 12 (hereafter "thread checker"). Thread checker 12 is securely mounted on a stable base 14 such as a workstation table in an assembly shop, for example with steel baseplates 14a and bolts 14b. Thread checker 12 has a rotating tap 16 threaded to mate with threaded bore 10a in part 10. Tap 16 is rotatably mounted on base 14 to spin on a fixed axis, driven for example by an electric motor 13 mounted underneath the table. The tap is connected to the motor through a rotatable chuck 13a adapted to securely receive a lower shank portion 16a of tap 16. In the illustrated embodiment tap 16 is made from tool steel, but it will be understood that other materials could be used depending on the material which forms the bore in part 10.

Tap 16 has an external thread-form 16b, interrupted by cutting flutes 16c, that mates with bore 10a in part 10. Tap 16 is either a specially formed tool designed to mimic a mating threaded part that will later be assembled with molded part 10; or, tap 16 is a modified mating threaded part adapted to be mounted in thread checker 12 and rotatably driven by motor 13 in chuck 13a. For example, a mating threaded part can be modified by machining flutes 16c into the thread-form to provide cutting and work-relief faces needed to remove excess material from the threaded bore. The modified mating threaded part might be ready to connect to motor 13, or it might need a lower portion ground off to form a shank, or a shank might be added to one end to be grasped in chuck 13a. These and other modifications to mating threaded parts for use as the rotating tap 16 will be apparent to those skilled in the art, and will depend on the type of part.

It will also be understood that while tap 16 is shown driven by an in-line electric motor to which it is connected by a chuck, other known apparatus for spinning the tap on a fixed, stable axis can be used without departing from the scope of the invention. Further, while the illustrated thread checker 12 is shown with a vertical motor drive axis and a vertical axis tap 16 relative to the workstation, other drive-axis and tap-axis orientations, including horizontal and inverted, are possible.

Still referring to FIG. 1, thread checker 12 has a passive parallel guide structure 18 (rods 18b and walls 18c) associated with tap 16. Guide structure 18 is shaped and arranged around the tap to slidingly engage portions of part 10, permitting part 10 to travel along the length of tap 16 in parallel alignment with the tap axis as the tap threads 16b engage bore 10a, and to prevent the part from rotating while doing so. The illustrated example of FIG. 1 shows both part-internal and part-external guides 18b and 18c. The part-internal guides 18b are a pair of vertical rods adapted to slidingly engage holes 10b in the body of part 10, and the part-external guides 18c are a pair of wall members adapted to slidingly engage exterior side surfaces 10c of part 10 in a close sliding fit. It will be understood that whether to use part-internal guides that go through the part, part-external guides that engage outer surfaces or edges of the part, or a combination of both will depend on the nature and shape of the part whose threads are being checked. It will also be understood that while pairs of guides for preventing rotation are shown, single guides whose shape presents a non-rotatable sliding engagement with some interior or exterior portion of the part could also be used. For example, a single rectangular internal guide rod 18b might be used if part 10 has a conveniently located rectangular hole through its body.

Thread checker 12 preferably includes a protective housing 20 surrounding tap 16 and part 10 and guides 18, to prevent accidental contact with the cutting flutes and/or interference with the part as the part is moving up and down the tap. In the illustrated embodiment, housing 20 is formed in part by the exteriors 20a of guide walls 18c, and in part by a clear front wall or window 20b connected to walls 18c and allowing the operator to watch the part's progress. It is also preferred that the rear of the housing 20 (opposite the operator) is left open for manual access to a limit switch (discussed below), for routine cleaning, and for access to the tap for adjustments or replacement.

Thread checker 12 includes a reversing limit switch mechanism 22 placed for activation by some portion of part 10 at the part's lower limit of travel. Limit switch 22 is connected by wiring 24 to motor 13, and/or to a motor power source to reverse the motor in response to momentary operation of switch button 22a. Suitable circuitry or control structure for reversing the motor in response to switch activation can be located in the switch housing, between the motor and the switch, or in the motor itself, and will be apparent to those skilled in the art.

Referring to the arrow R in FIG. 1, tap 16 normally rotates in a direction that would disengage the tap threads 16a from the part's threaded bore 10a. This is the default mode of rotation. Motor 13 preferably drives tap 16 in constant fashion, such that the tap is always rotating as long as power is supplied to thread checker 12.

Referring to FIG. 2, the operator has manually reversed the rotation direction of tap 16, as shown by the arrow F. The manual reverse can be accomplished using any known switch mechanism for reversing the direction of motor 13, including but not limited to a separate hand-operated switch (not shown) on the motor housing or workstation, or a foot-operated switch (not shown) on the floor or a lower part of the workstation. In the preferred, illustrated embodiment, however, the workstation operator uses the reversing limit switch 22, which is easily accessed through the open rear of housing 20. A simple press with a finger on switch 22 is sufficient to reverse the direction of rotation from R in FIG. 1 to F in FIG. 2. Manual activation of switch 22 by the workstation operator is made easier by a limit-activating cam strip 23 extending below switch button 22a and described further below.

Although a manually activated reverse of motor 13 for initially engaging part 10 is the preferred, illustrated example, those skilled in the art will recognize that switches operated in a more automatic fashion are possible. By way of non-limiting example, a photo-optical switch that senses the approach or initial engagement of part 10 with guide structure 18 could be used, or a mechanical switch triggered by the initial engagement of the part with guide structure 18 could be used.

FIG. 3 shows part 10 having bottomed out on tap 16, bore 10a having traveled fully over the tap, and an external portion of part 10 displacing the lower end of cam strip 23 into switch-activating engagement with switch button 22a.

Figure 4:
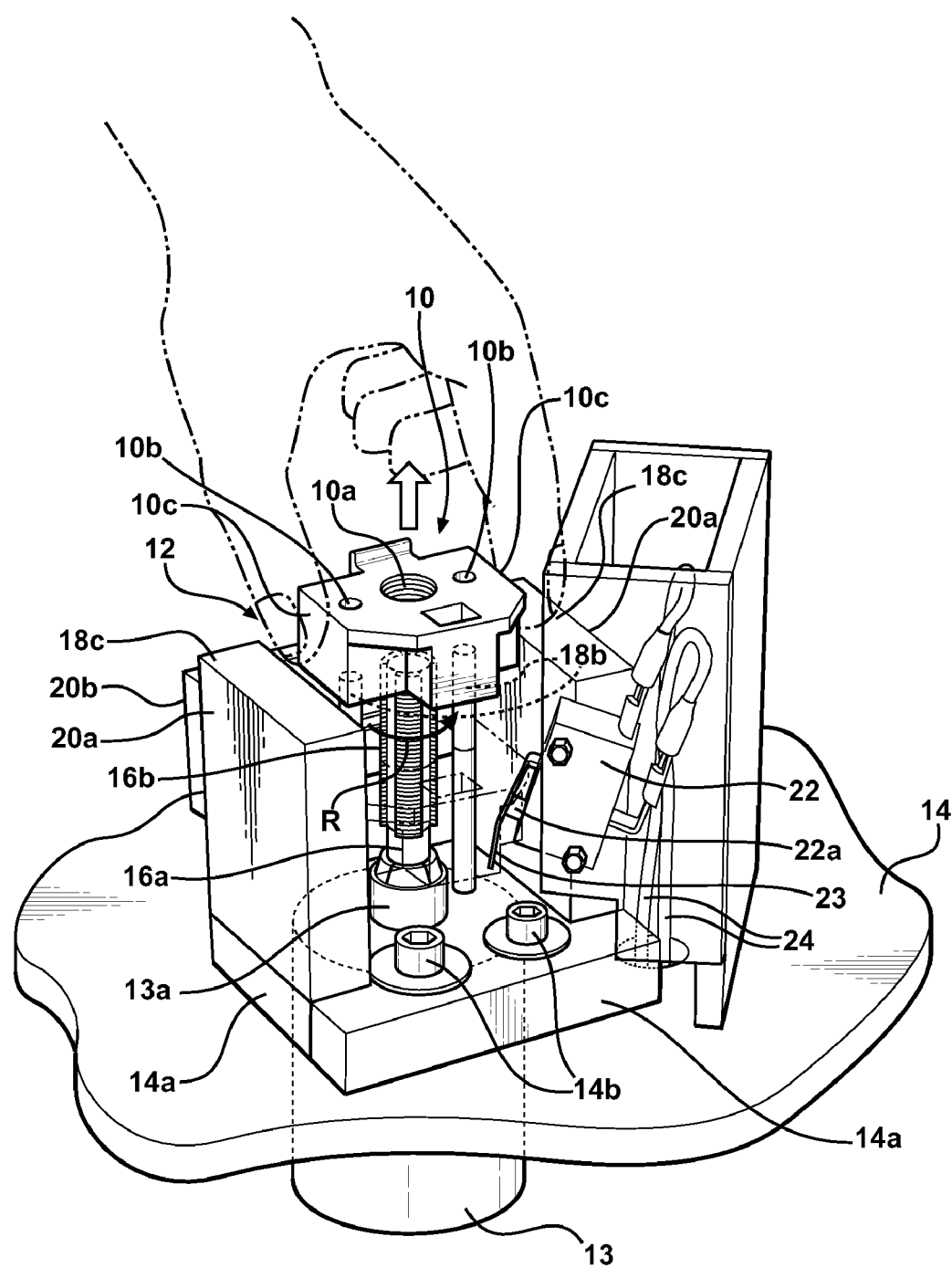
FIG. 4 is similar to FIG. 1, but shows the molded part being driven off the tap where it can be removed from the guide structure.

The manually-activated reversing limit switch mechanism 22, 23, coupled with the default tap rotation direction R, results in a simple, inexpensive, and nearly foolproof part-feed and switching operation, particularly where a human workstation operator is desirable or preferred. The need for conscious activation of a switch in close physical and visual association with the guide and tap structures ensures the operator's careful attention to the part-engaging step, since the switching and part-engaging steps must be coordinated. The automatic limit-reversing activation of switch 22 via cam strip 23 helps keep the operator's hands away from the tap and the part while the part is moving over the tap. And, finally, as shown in FIG. 4, the part is automatically driven back off the tap even if the workstation operator is inattentive, and will float harmlessly on top of the reverse-rotating end of the tap, restrained by the guides 18, until removed by the workstation operator. It is preferable to make one of the guide rods 18b slightly shorter than the other to aid in part removal.

Figure 5:
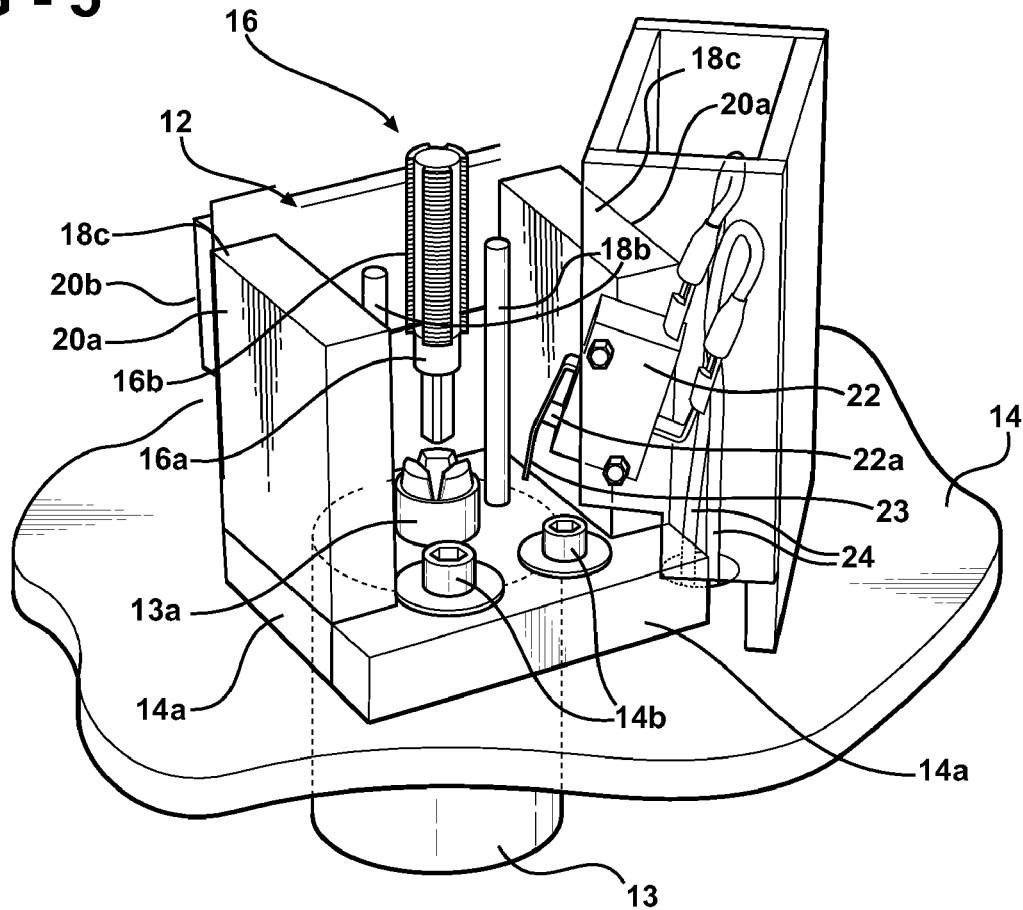
FIG. 5 is a perspective view of the apparatus of FIG. 1, with the tap exploded off a chuck in the apparatus.

Referring next to FIG. 5, tap 16 is shown removed from chuck 13a for replacement, maintenance, or adjustment. Any known chuck apparatus can be used to hold tap 16 in an operative, rotating connection to motor 13.

Figure 6:
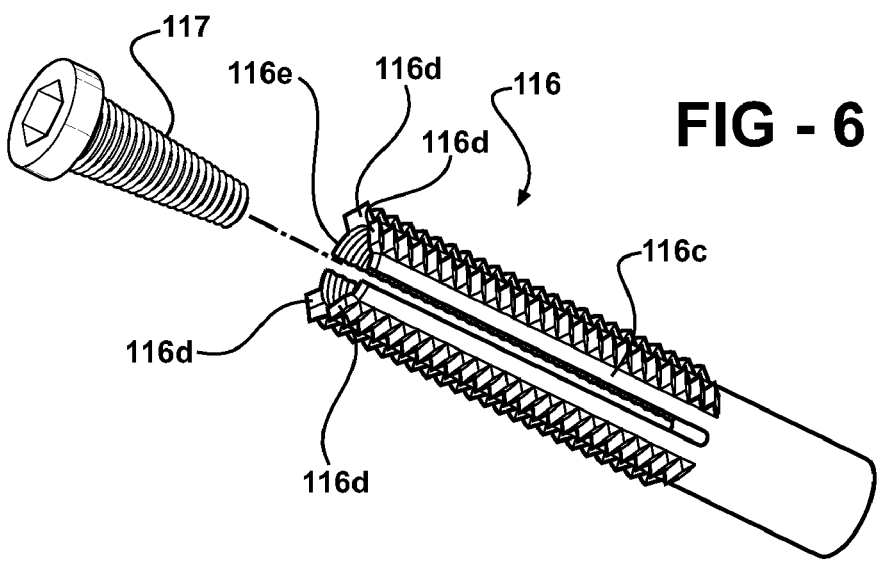
FIG. 6 is a detailed perspective view of a split, adjustable tap for use in the apparatus of FIG. 1.

FIG. 6 shows a modified tap 116, split through cutting flutes 116c into four cantilevered cutting sections 116d, and having a threaded central bore 116e that accepts a tapered adjustment screw 117. Threading screw 117 into bore 116e spreads cutting sections 116d apart for a greater cutting diameter; backing screw 117 out of bore 116e reduces the tap's cutting diameter. This allows the operator to make very fine adjustments to tap 116 to increase or reduce the amount of material removed by the tap from bore 10a in part 10. The proper adjustment can be gauged by hand using a test part, and then screw 117 can be temporarily secured in place to lock the adjustment, for example with a spot weld or thread-locking adhesive. It will be understood that while a tapered screw is illustrated, other devices for adjusting the cutting diameter of the modified tap 116 can be used, for example a screw with a tapered bushing, or a screw with a tapered cone.

It will be understood that while adjustable tap 116 is shown split into four equal sections, it may be split into more or fewer adjustable sections as desired. It will also be understood that the tapered screw will spread the upper ends of the sections 116d very slightly farther apart than their lower portions, but that this will not affect the quality of the verifying and chasing operation. For example, the cutting diameter of the upper portion of the tap in the illustrated embodiment can be modified up to 0.050 inches in diameter.

Figure 7:
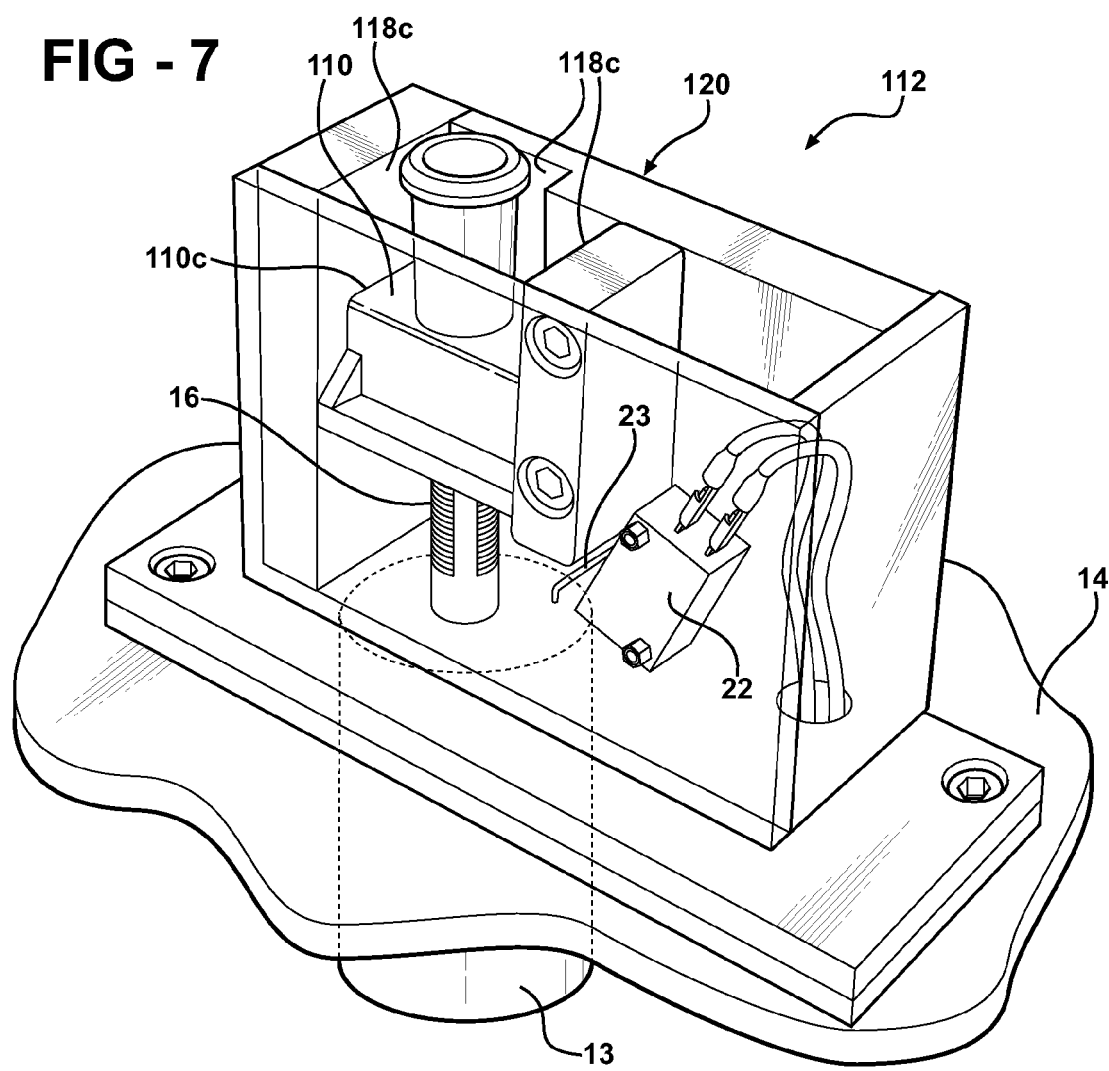
FIG. 7 is a perspective view of an alternate apparatus according to the invention, using the same rotating tap as in FIG. 1, but with a different guide structure for a different part.

Referring next to FIG. 7, a modified thread checker 112 with a part-external guide structure 120 is illustrated for a part 110 that is verified/chased by the same tap 16 illustrated in FIGS. 1-5. Although part 110 has a threaded bore 110a identical in diameter and pitch to 10a, it does not have through-holes such as 10b that allowed part 10 to be guided on rods 18b. Accordingly, the housing 120 around the tap is sized with interior guide wall surfaces 118c that maintain a close sliding fit with at least two exterior side surfaces 110c of part 110, preventing the part from rotating as it is drawn down tap 16. It will be understood that a purely part-external guide structure such as 120 can be configured to guide many different shapes of part having two or more exterior side surfaces which when held will prevent the part from rotating.

It will finally be understood that the disclosed embodiments are representative of presently preferred forms of the invention, but are intended to be illustrative rather than definitive of the invention. The scope of the invention is defined by the following claims.

I claim:

1. A thread-verification and thread-chasing apparatus for a part with a threaded bore, comprising:
a fixed-axis tap rotating on a workstation with a free outer end, the rotating tap comprising a thread-form adapted to make threaded engagement with a threaded bore of a part to verify the threaded bore, and further comprising one or more cutting surfaces to chase the threaded bore;
motor means associated with the workstation for reversibly rotating the tap;
a parallel passive guide structure associated with the rotating tap on the workstation, the guide structure adapted to allow a part with a threaded bore to slide freely on the guide structure into engagement with the free end of the rotating tap when the part is placed on the guide structure, the guide structure maintaining the part's threaded bore in alignment with the axis of the rotating tap during engagement of the part with the rotating tap, the guide structure preventing the part from rotating during engagement of the part with the rotating tap, the guide structure allowing the part to be drawn freely along the tap by virtue of the rotating tap's threaded engagement with the part's threaded bore; and,
limit switch means for reversing the direction of the motor means once the part's threaded bore has been fully verified and chased by the rotating tap, such that the part is driven off the rotating tap while remaining in sliding engagement with the guide structure.

2. The apparatus of claim 1, wherein the limit switch means comprises a limit actuator associated with an inner end of the rotating tap and the guide structure, the limit actuator located to be contacted by the part when the threaded bore has been fully verified and chased.

3. The apparatus of claim 2, wherein the rotating tap normally rotates in a direction tending to drive a part off the tap, and wherein the motor means is reversed when the part is engaged with the guide structure such that the rotating tap draws the part toward the limit switch means.

4. The apparatus of claim 3, wherein the limit switch means is manually accessible to a workstation operator, and the limit switch means is adapted to be manually operated to reverse the motor means when the part is engaged with the guide structure.

5. The apparatus of claim 1, wherein the guide structure comprises a part-internal guide.

6. The apparatus of claim 1, wherein the guide structure comprises a part-external guide.

7. The apparatus of claim 1, wherein the guide structure comprises a part-internal guide and a part-external guide.

8. The apparatus of claim 1, wherein the rotating tap comprises multiple cantilevered sections, the cantilevered sections being internally tapped to form an internally threaded tap bore capable of accepting a tapered screw, and further comprising a tapered screw to adjust the radial spacing of the cantilevered sections.

9. A method of verifying and chasing a threaded bore in a part, comprising the steps of:
loading a part onto a guide structure mounted on a workstation and associated with a fixed-axis rotating tap having a free outer end, thereby causing a threaded bore in the part to be guided onto and mated with the free outer end of the rotating tap;
allowing the part to be drawn down the rotating tap while in sliding, rotation-preventing engagement with the guide structure until the part operates a reversing limit switch associated with the guide structure to reverse the rotation of the rotating tap;
allowing the part to be driven off the rotating tap while in sliding, rotation-preventing engagement with the guide structure until the part is driven off the free outer end of the rotating tap;
and removing the verified and chased part from the guide structure.

10. The method of claim 9, further including the steps of initially rotating the tap in a direction tending to drive the part off the tap, and then reversing the rotation direction of the tap when the part is engaged with the free outer end of the tap to draw the part down the tap.

* * * * *